Figure 1:
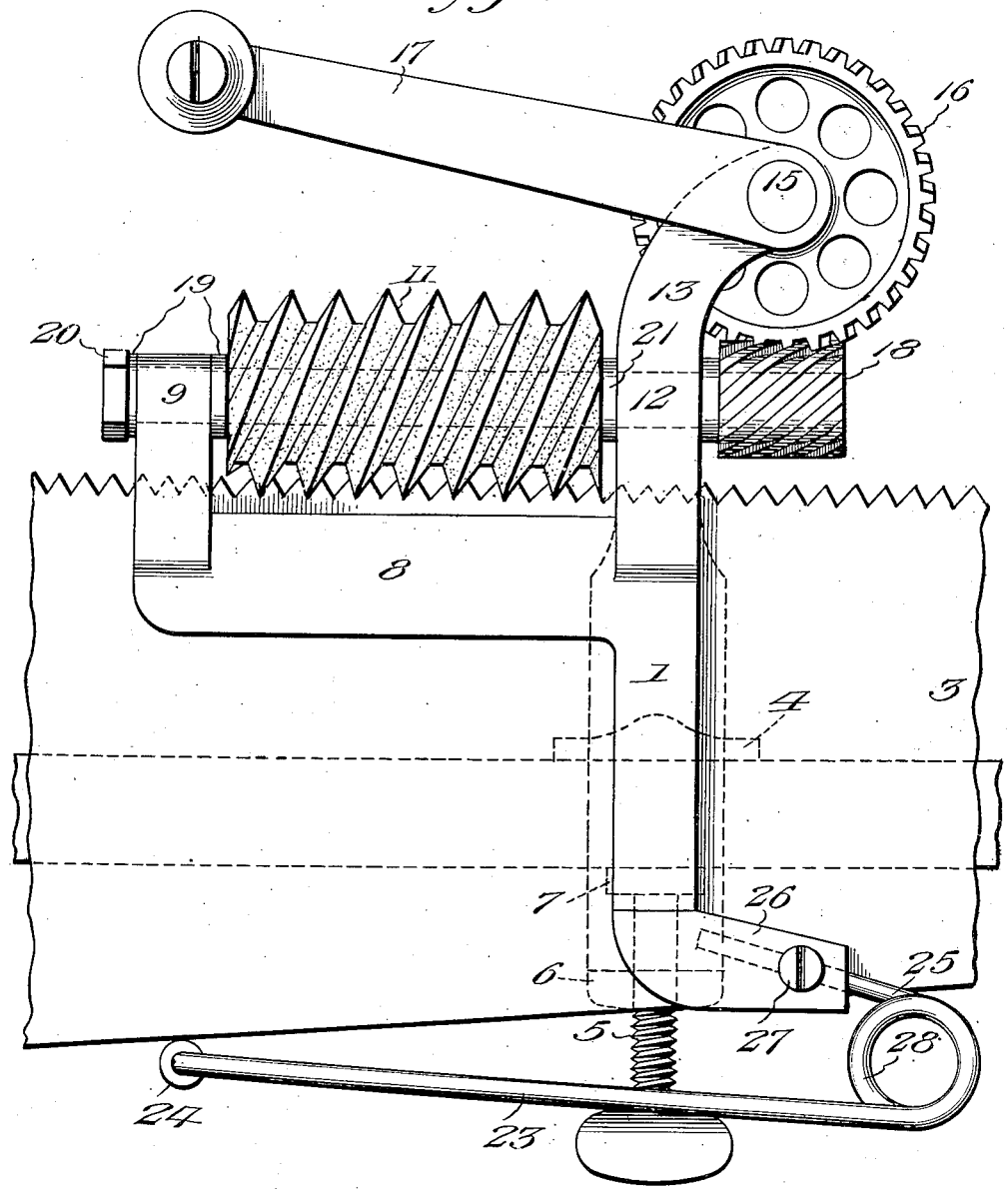

G. K. KAWAHARA.
SAW FILING MACHINE.
APPLICATION FILED JULY 17, 1908.

917,611.

Patented Apr. 6, 1909.
2 SHEETS—SHEET 1.

Witnesses
Edwin G. McKee.
R. M. Smith.

Inventor
George K. Kawahara

By Victor J. Evans.
Attorney

G. K. KAWAHARA.
SAW FILING MACHINE.
APPLICATION FILED JULY 17, 1908.
917,611.
Patented Apr. 6, 1909.
2 SHEETS—SHEET 2.
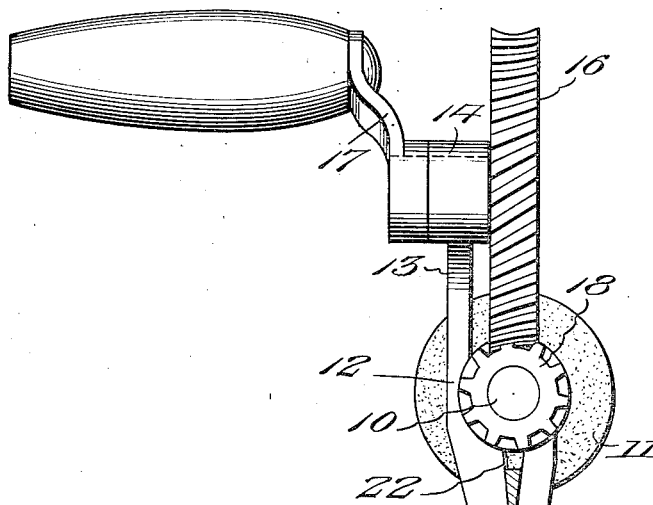
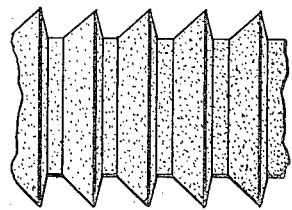
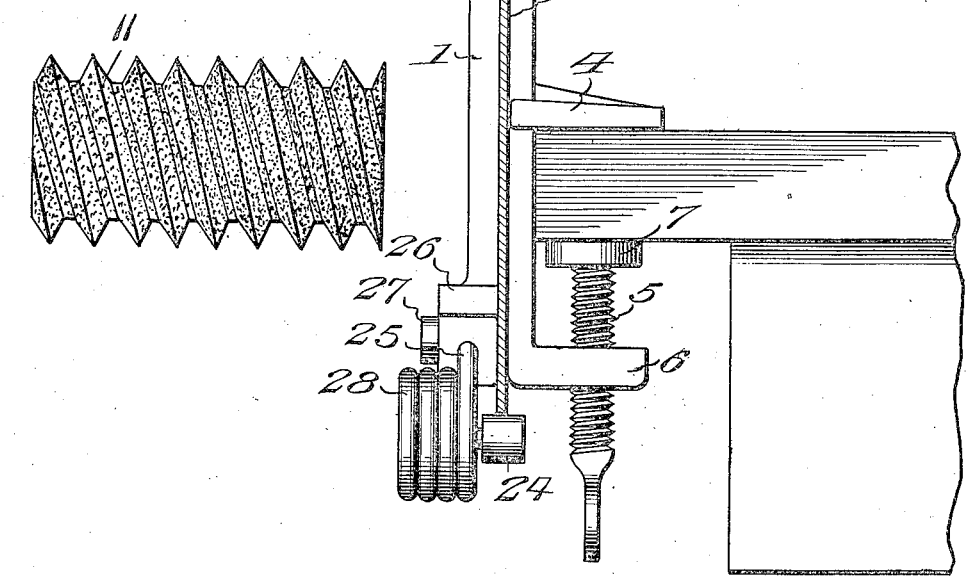
Witnesses
Edwin F. McKee,
P. M. Smith.
Inventor
George K. Kawahara
By Victor J. Evans
Attorney

UNITED STATES PATENT OFFICE.

GEORGE KOSA KAWAHARA, OF PASADENA, CALIFORNIA.

SAW-FILING MACHINE.

No. 917,611.   Specification of Letters Patent.   Patented April 6, 1909.

Application filed July 17, 1908. Serial No. 444,032.

*To all whom it may concern:*

Be it known that I, GEORGE K. KAWAHARA, a citizen of the United States of America, residing at Pasadena, in the county of Los Angeles and State of California, have invented new and useful Improvements in Saw-Filing Machines, of which the following is a specification.

This invention relates to saw filing machines, the object of the invention being to provide a simple and practical machine for filing and sharpening saws which is adapted to be readily applied to and removed from an ordinary work bench upon which the saw filing machine is supported during its operation.

A further object of the invention is to provide novel and effective means for holding the teeth of the saw in engagement with the file during the filing operation, while a still further object of the invention is to so mount the hand-operating mechanism with relation to the saw guide and holder that the line of strain applied to the frame of the machine by the hand operation thereof is in the same direction as the length of the saw.

With the above and other objects in view, the invention consists in the novel construction, combination and arrangement of parts as hereinafter fully described, illustrated and claimed.

In the accompanying drawings,—Figure 1 is a front elevation of a saw filing machine embodying the present invention, the supporting bench being illustrated by dotted lines. Fig. 2 is an end view of the machine shown applied to the work bench and illustrating a saw in cross section. Figs. 3 and 4 are fragmentary plan views of different forms of rotary files.

The filing machine of this invention comprises essentially a split guide post or saw guide 1 having a central space 2 in which the saw indicated at 3 is slidingly received, whereby said saw may be moved in the direction of its length as it is subjected to the action of the file. The post 1 is provided on one side with a bench clamp comprising a fixed jaw 4 and a clamp screw 5 which passes through a threaded opening in a lug or extension 6 formed at the bottom of the guide post, the screw 5 being preferably provided with a swiveled head 7 adapted to engage against the top of the bench on the side opposite the stationary jaw 4. In this way the filing machine as a whole is firmly fastened to a work bench or like support and may be readily detached when not needed further.

Extending laterally away from the post 1 is a bifurcated arm 8 between which the saw blade is also adapted to pass, and said arm is provided at its extremity with an upstanding bearing 9 for one end of an arbor 10 upon which the rotary file 11 is mounted. The arbor 10 is journaled in another bearing 12 arranged at the opposite end of the rotary file and formed by an upwardly extending bracket arm 13, the latter being provided at its upper end with a bearing 14 for the shaft 15 of a worm wheel 16, the shaft 15 also having fast thereon a hand-operating crank 17. The worm wheel 16 meshes with a worm 18 fast on the arbor 10, and in this way rotary motion is imparted to the arbor 10 and file 11 thereon. Spacing collars 19 are interposed between the bearing 9 and one end of the file 11 and a retainer 20 on the adjacent end of the arbor, which retainer may be in the form of a nut. Other spacing collars 21 are arranged at opposite sides of the bearing 12, one between said bearing and the adjacent end of the worm 18. By means of the construction just described it will be observed that the force applied to the operating crank 17 is directed lengthwise of the saw blade, thus avoiding the liability of twisting or bending the saw in the operation of the machine.

It is designed to employ several kinds of rotary files 11, one form of which is shown in Fig. 1 as adapted for saw blades having coarse teeth. The file illustrated in Fig. 3 is shown as provided with finer teeth for operating on a saw having teeth of corresponding gage, the file shown in Fig. 3 being especially adapted for cross-cut saws. Both of the files shown in Figs. 1 and 3 are provided with spirally arranged cutting teeth which, in the rotary movement of the file, operate to advance the saw blade lengthwise, operating successively on the teeth thereof. In the form illustrated in Fig. 4, the teeth of the file extend circumferentially around the body of the file and are especially adapted for the filing of rip saws. Under the arrangement shown in Fig. 4, the file does not act to advance the saw blade, the latter having to be advanced by hand periodically after filing or sharpening a certain number of teeth thereof, corresponding with the number of teeth on the rotary file.

By reference to Fig. 2 it will be observed that the upper portion of the space 2 of the post in which the saw blade is received is flared, as shown at 22, to allow for the lateral swaging of the saw teeth. The teeth of the saw are held yieldingly in engagement with the teeth of the file by means of an adjustable tension device consisting of a spring 23 carrying at the extremity thereof a tension roller 24 adapted to bear against the back edge of the saw, as clearly illustrated in Figs. 1 and 2. The tension device also comprises a short inclined arm 25 which is received slidingly in an inclined socket in the foot extension 26 at the bottom of the saw guide or guide post 1, the arm 25 of the spring being retained in position by means of a set screw 27 passing through a threaded opening in the foot extension 26 and binding against the arm 25, thereby providing for adjusting the pressure of the spring against the saw. The spring arms 23 and 25 of the tension device are connected by a coil 28 involving one or more convolutions to impart the necessary resiliency to the longer arm 23 of the spring. By the means described the saw blade is urged toward the rotary file to effect the necessary pressure between the teeth of the rotary file and the teeth of the saw to produce the necessary abrasive action which results in the proper and accurate sharpening and jointing of the saw teeth.

By reference to Figs. 1 and 3 it will be observed that a right hand file is shown in one of said figures while a left hand file is illustrated in the other figure. It will also be noted that the teeth on the file are of sufficient size to bridge two of the teeth on the saw. Therefore, in filing a saw, it is first fed along in one direction and subjected to the action of the right hand file, for example, after which the left hand file is inserted in the machine and the saw is fed in the opposite direction. This provides for filing the saw teeth at the proper pitch and also insures the uniform filing of the teeth and bringing the same to a uniform height.

Having thus described the invention, what is claimed as new, is:—

A saw filing machine comprising a bifurcated saw guiding post, a bifurcated arm extending upward from said post, a mandrel journaled on said arm and an upward extension on the post, a rotary file carried by the mandrel, hand-operated means for actuating said mandrel, a foot extension at the bottom of the guide post having an inclined socket, and a tension spring supported by said foot extension and acting to urge the saw toward the file, said spring comprising an inclined terminal portion which is adjustable in said inclined socket.

In testimony whereof I affix my signature in presence of two witnesses.

GEORGE KOSA KAWAHARA.

Witnesses:
HARRY TOKUTARO NAGAFUCHI,
ARATA NARITOMI.